United States Patent
Albisu

(10) Patent No.: US 9,548,963 B2
(45) Date of Patent: Jan. 17, 2017

(54) METHOD AND SYSTEM TO ENABLE A VIRTUAL PRIVATE NETWORK CLIENT

(71) Applicant: AT&T Intellectual Property I, LP, Atlanta, GA (US)

(72) Inventor: Luis Francisco Albisu, Fairfax Station, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 268 days.

(21) Appl. No.: 14/231,969

(22) Filed: Apr. 1, 2014

(65) Prior Publication Data

US 2015/0281181 A1 Oct. 1, 2015

(51) Int. Cl.
 *H04L 29/06* (2006.01)
 *H04L 12/28* (2006.01)
 *H04W 92/10* (2009.01)

(52) U.S. Cl.
 CPC ....... *H04L 63/0272* (2013.01); *H04L 12/2858* (2013.01); *H04L 63/18* (2013.01); *H04L 63/08* (2013.01); *H04W 92/10* (2013.01)

(58) Field of Classification Search
 CPC ........ H04L 63/08; H04L 63/272; H04L 47/76; H04L 47/762; H04L 47/765; H04W 92/10
 See application file for complete search history.

(56) References Cited

U.S. PATENT DOCUMENTS

| | | | |
|---|---|---|---|
| 7,069,336 B2* | 6/2006 | Mangan | H04L 12/4641 370/401 |
| 7,197,550 B2 | 3/2007 | Cheline et al. | |
| 7,308,706 B2* | 12/2007 | Markham | H04L 63/20 709/227 |
| 7,441,270 B1 | 10/2008 | Edwards et al. | |
| 7,558,862 B1 | 7/2009 | Tyukász et al. | |
| 7,724,732 B2 | 5/2010 | Guichard et al. | |
| 7,769,037 B2 | 8/2010 | Booth, III et al. | |
| 7,827,263 B1 | 11/2010 | Howarth et al. | |
| 8,099,764 B2 | 1/2012 | Herzog et al. | |

(Continued)

OTHER PUBLICATIONS

Juniper Networks Firewall/VPN Feature Brief. "Secure Dynamic VPNs" ©2005 Juniper Networks, Inc. (2 pages).*

(Continued)

*Primary Examiner* — Darren B Schwartz
*Assistant Examiner* — Thomas Gyorfi
(74) *Attorney, Agent, or Firm* — Guntin & Gust, PLC; Jay H. Anderson

(57) ABSTRACT

Aspects of the subject disclosure may include, for example, a method comprising transmitting, by a controller comprising a processor, a request to a server to enable initiation of a virtual private network session on behalf of devices other than the controller. The controller transmits authentication information to enable the server to validate the request, and receives a first list of computing devices. The controller transmits a first selection of a target device from the first list to cause the server to initiate the virtual private network session between the target device and a service node providing services to the target device via the virtual private network session. The controller receives a second list of applications executable on each of the computing devices, and transmits to the server a second selection of an application from the second list that is executable by the target device. Other embodiments are disclosed.

20 Claims, 9 Drawing Sheets

(56) References Cited

U.S. PATENT DOCUMENTS

| | | | |
|---|---|---|---|
| 8,196,181 B2 | 6/2012 | Devonshire et al. | |
| 8,214,471 B2 | 7/2012 | Doshi et al. | |
| 8,296,437 B2 | 10/2012 | Pankratov | |
| 8,464,335 B1 | 6/2013 | Sinha et al. | |
| 8,578,076 B2 | 11/2013 | van Der Linden et al. | |
| 8,655,327 B1 | 2/2014 | Mateer et al. | |
| 2003/0149787 A1* | 8/2003 | Mangan | H04L 12/4641 709/238 |
| 2003/0182431 A1* | 9/2003 | Sturniolo | H04L 63/0272 709/227 |
| 2003/0208602 A1 | 11/2003 | Bhalla et al. | |
| 2004/0037275 A1* | 2/2004 | Li | H04L 45/50 370/370 |
| 2005/0177515 A1 | 8/2005 | Kalavade et al. | |
| 2007/0061887 A1* | 3/2007 | Hoover | G06F 21/6218 726/26 |
| 2007/0195788 A1* | 8/2007 | Vasamsetti | H04W 28/24 370/395.21 |
| 2007/0209058 A1* | 9/2007 | Anantharamiah | H04L 41/0806 726/1 |
| 2008/0285438 A1 | 11/2008 | Marathe et al. | |
| 2008/0301801 A1* | 12/2008 | Jothimani | H04L 12/4641 726/15 |
| 2009/0228973 A1 | 9/2009 | Kumar et al. | |
| 2010/0154050 A1 | 6/2010 | Mukkara et al. | |
| 2010/0257583 A1 | 10/2010 | Ngo et al. | |
| 2011/0251992 A1* | 10/2011 | Bethlehem | H04L 12/2863 707/610 |
| 2012/0191770 A1 | 7/2012 | Perlmutter et al. | |
| 2013/0036206 A1 | 2/2013 | Cromer et al. | |
| 2013/0297933 A1 | 11/2013 | Fiducia et al. | |
| 2013/0347072 A1 | 12/2013 | Dinha | |

OTHER PUBLICATIONS

Aucinas, Andrius et al., "Signposts: End-to-End Networking in a World of Middleboxes", SIGCOMM, ACM 978, Aug. 13, 2012, 83-84.

Bahl, Paramvir, "Advancing the State of Mobile Cloud Computing", MCS, ACM 978, Jun. 25, 2012, 7 pages.

Brodsky, Charles, "Configuring a Cisco PIX to use TACACS+ for authentication of a remote user VPN", GIAC, GSEC Practical Assignment, Version 1.4b, Option 1, Sep. 3, 2004, 23 pages.

Deri, Luca et al., "N2N: A Layer Two Peer-to-Peer VPN", Symstream Technologies, Melbourne, Australia, 2008, 13 pages.

Zhang, Xinwen et al., "Towards an Elastic Application Model for Augmenting the Computing Capabilities of Mobile Devices with Cloud Computing", Huawei Research Center, Santa Clara, CA, Jun. 2011, 14 pages.

* cited by examiner

METHOD AND SYSTEM TO ENABLE A VIRTUAL PRIVATE NETWORK CLIENT

FIELD OF THE DISCLOSURE

The subject disclosure relates to enabling a virtual private network client to execute on a remote device.

BACKGROUND

Virtual Private Networks (VPNs) are used to connect a variety of devices and execute applications ("apps") on those devices. A typical VPN is created by establishing a virtual point-to-point connection over the Internet between authenticated computing devices.

BRIEF DESCRIPTION OF THE DRAWINGS

Reference will now be made to the accompanying drawings, which are not necessarily drawn to scale, and wherein.

DETAILED DESCRIPTION

Figure 1:
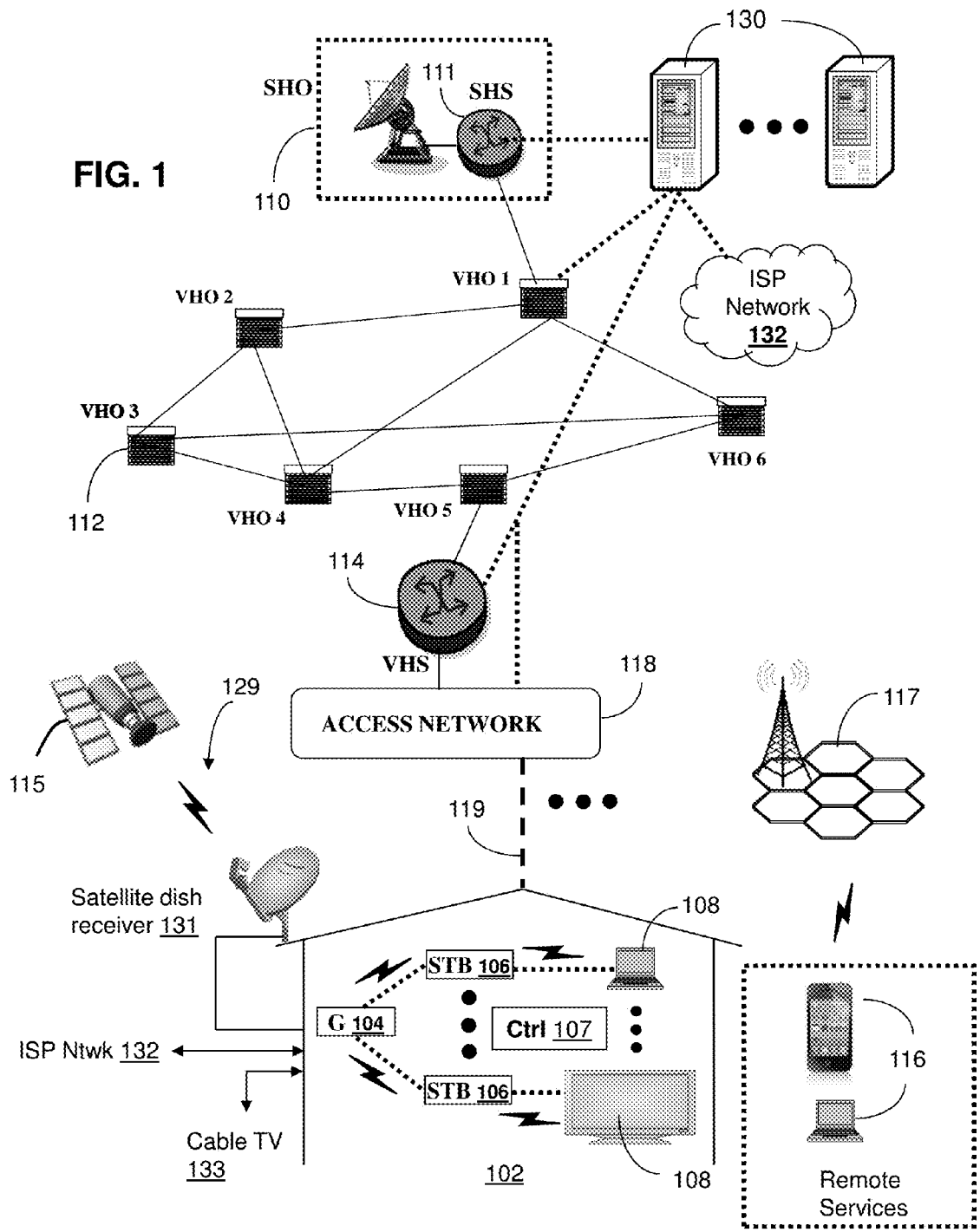
FIGS. 1-2 depict illustrative embodiments of communication systems on which a virtual private network can be established.

The subject disclosure describes, among other things, illustrative embodiments of a system and method for establishing virtual private network (VPN) connections, and more specifically to an application executing on a mobile device (mobile app) that can manage and execute VPN connections, including initiating a VPN session on another device. Other embodiments are included in the subject disclosure.

One embodiment of the subject disclosure includes a server having a memory to store instructions and a processor coupled to the memory. The processor, responsive to executing the instructions, can perform operations including receiving a request from a mobile device to enable facilitation of a virtual private network session on behalf of computing devices other than the mobile device. The processor can receive authentication information from the mobile device authentication information to validate the request. The processor performs additional operations responsive to successfully authenticating the mobile device, including transmitting to the mobile device a first list of computing devices and a second list of applications executable on each of the computing devices. The processor can receive from the mobile device a first selection of a target device from the first list of computing devices and a second selection of an application from the second list of applications that is executable by the target device. The processor can facilitate the virtual private network session between the target device and a service node providing services to the target device via the virtual private network session. The services provided to the target device by the service node can be limited to the application selected from the second list of applications.

One embodiment of the subject disclosure includes a non-transitory computer-readable storage device comprising instructions which, responsive to being executed by a processor, cause the processor to perform operations including receiving from a first device a request to enable facilitation of a virtual private network session on behalf of devices other than the first device, and receiving from the first device authentication information to validate the request. The processor can perform additional operations responsive to successfully authenticating the first device, including transmitting to the first device a first list of computing devices and receiving from the first device a first selection of a target device from the first list of computing devices. The processor can facilitate the virtual private network session between the target device and a service node providing services to the target device via the virtual private network session.

One embodiment of the subject disclosure is a method including transmitting, by a controller comprising a processor, a request to a server to enable initiation of a virtual private network session on behalf of devices other than the controller. The method can include transmitting, by the controller, authentication information to enable the server to validate the request. The method can include receiving, by the controller, from the server a first list of computing devices, and transmitting, by the controller, to the server a first selection of a target device from the first list of computing devices to cause the server to initiate the virtual private network session between the target device and a service node providing services to the target device via the virtual private network session.

FIG. 1 depicts an illustrative embodiment of a first communication system 100 for delivering media content. Communication system 100 includes computing devices that can be connected in a virtual private network. The communication system 100 can represent an Internet Protocol Television (IPTV) media system. Communication system 100 can be overlaid or operably coupled with systems 500 or 800 of FIGS. 5 and 8 respectively, as another representative embodiment of communication system 100. In particular, a computing device included in communication system 100 (for example, device 130) can function as a server receiving a request from a mobile communication device to establish a connection with a virtual private network client on another device remote from the server, receiving an encrypted data stream from the mobile communication device, performing a two-factor authentication process to authenticate the mobile communication device, transmitting to the mobile communication device a first list of remote devices authorized to execute the virtual private network client and a second list of applications executable on a remote device included in the first list, receiving from the mobile communication device a first selection of a target device from the first list and a second selection of an application from the second list, establishing the connection with the target device, enabling the target device to execute the virtual private network client to initiate a virtual private network session, and enabling the target device to execute the selected application in the virtual private network session.

The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wireline media devices 108 or wireless communication devices 116. In addition, device 130 can operate as a virtual private network (VPN) provisioning and maintenance server for providing VPN services, as described in more detail below.

Communication system 100 can also provide for all or a portion of the computing devices 130 to function as a virtual private network platform server (herein referred to as a platform). The platform can use computing and communication technology to initiate VPN connections, which can include among other things, receiving and authenticating connection requests. In particular, the wireless communication devices 116 can be provisioned with secure messaging and encryption functions to utilize the services of the platform.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 2:
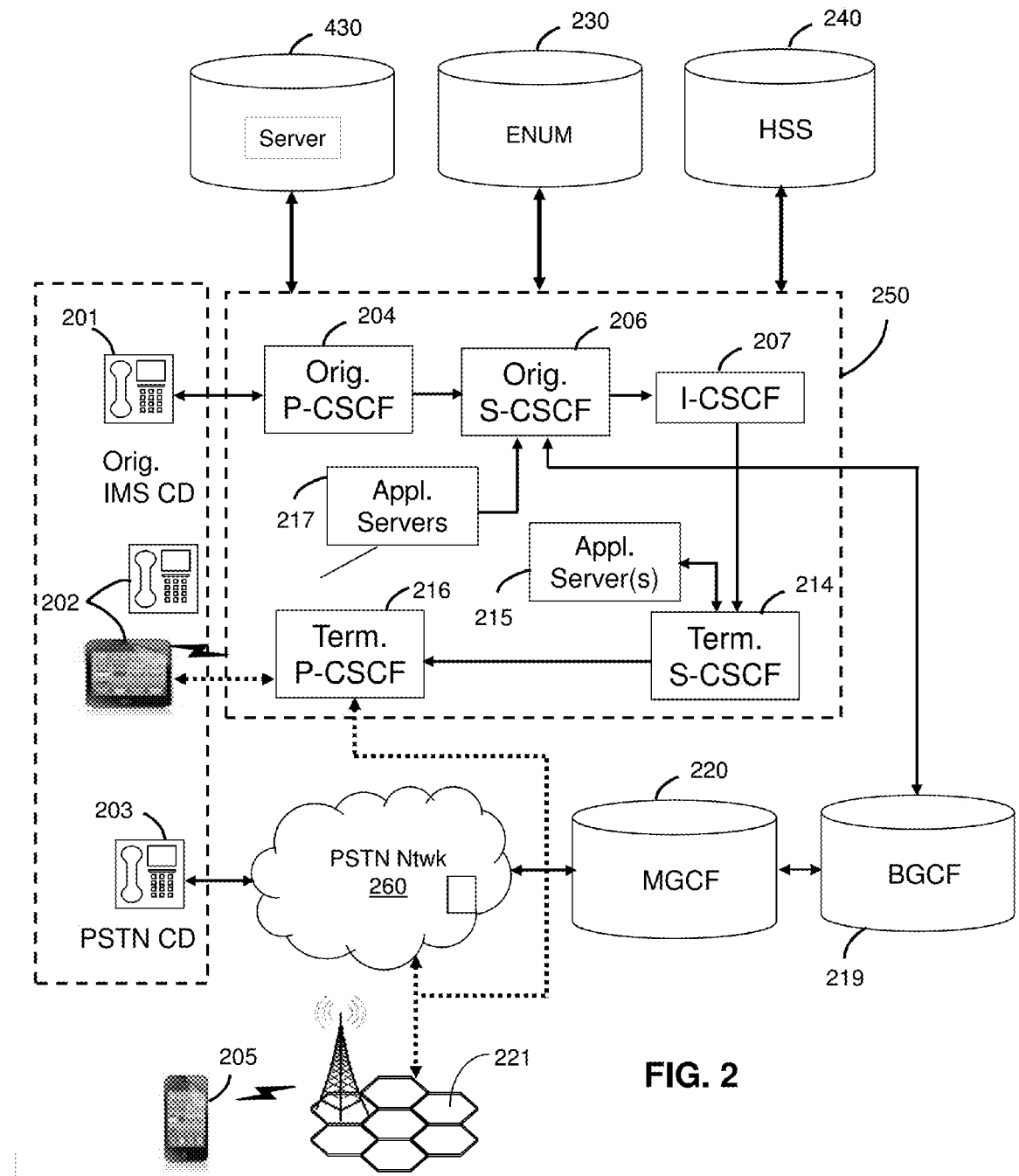

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with system 500 or system 800 (shown in FIGS. 5 and 8 respectively) and communication system 100 as another representative embodiment of communication system 100. Furthermore, system 200 can include an application server performing a method a method including receiving, by the server, a request from a mobile communication device to establish a connection with a virtual private network client on a remote device; receiving, by the server, an encrypted data stream from the mobile communication device including an identifier for the mobile communication device; performing, by the server, a multi-factor authentication process to authenticate the mobile communication device; transmitting by the server to the mobile communication device a first list of remote devices authorized to execute the virtual private network client; receiving, by the server, from the mobile communication device a first selection of a target device from the first list; establishing, by the server, the connection with the target device; and enabling, by the server, the target device to execute the virtual private network client, thereby initiating a virtual private network session.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 2.

Cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 130 of FIG. 1 can be operably coupled to communication system 200 for purposes similar to those described above. Server 130 can perform VPN platform functions and provide VPN services to the CDs 201, 202, 203 and 205 of FIG. 2. CDs 201, 202, 203 and 205, which can be adapted with software to execute the mobile app to request that a VPN session be established using the VPN platform. The VPN platform can be an integral part of the application servers 217 performing authentication of mobile devices, which can be adapted to the operations of the IMS network 250.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 3:
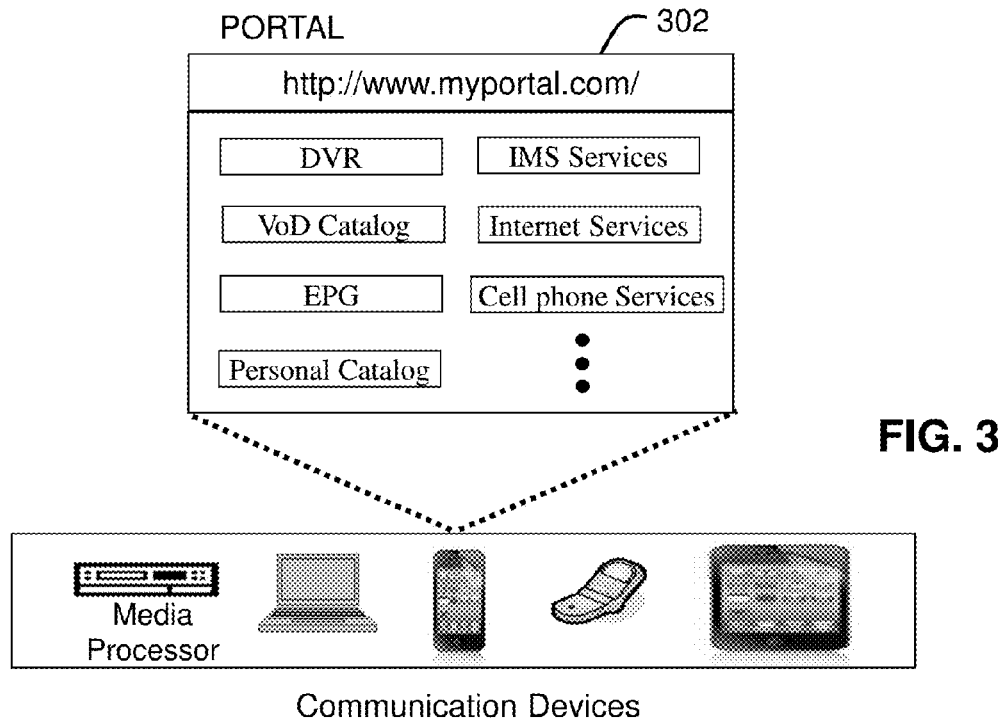
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. Communication system 300 can be communicatively coupled to systems 500 and 800 of FIGS. 5 and 8, communication system 100, and/or communication system 200. The web portal 302 can be used for managing services of systems 500 and 800 of FIGS. 5 and 8 and communication systems 100, 200. A web page of the web portal 302 can be accessed by a Uniform Resource Locator (URL) with an Internet browser using an Internet-capable communication device such as those described in FIGS. 1 and 2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

The web portal 302 can further be utilized to manage and provision virtual private network services as may be desired by subscribers and/or service providers of systems 200, 400, 500 and 800.

Figure 4:
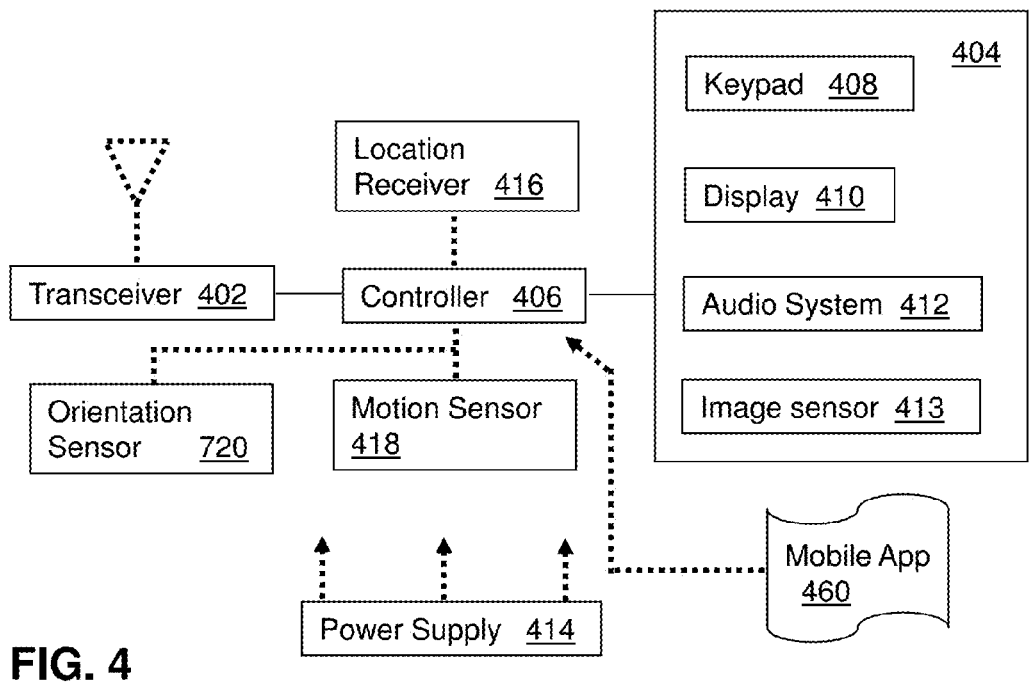
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1 and 2. Communication device 400 in whole or in part can represent any of the mobile devices described in FIGS. 5 and 8, and can be configured to perform portions of the methods of FIGS. 6, 7 and 9.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 100.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or fewer of the circuit components shown in FIG. 4. These variant embodiments can be used in one or more embodiments of the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other devices that can operate in communication systems 100, 200 of FIGS. 1 and 2 such as a gaming console and a media player.

The communication device 400 shown in FIG. 4 or portions thereof can serve as a representation of one or more of the devices of communication system 100 and communication system 200. In addition, the controller 406 can be adapted in various embodiments to execute a mobile application (mobile app) 460 to manage connections in a virtual private network.

According to the disclosure, a virtual private network (VPN) can be established by a simple and secure process where a mobile device initiates a VPN connection to another device; the other device can be a laptop, desktop, tablet, server, etc. In embodiments of the disclosure, VPN connections are made more secure by eliminating inward access to an enterprise; all connectivity is initiated from a central VPN server going outward. In other embodiments, devices can be deployed that allow connectivity to external networks.

Figure 5:
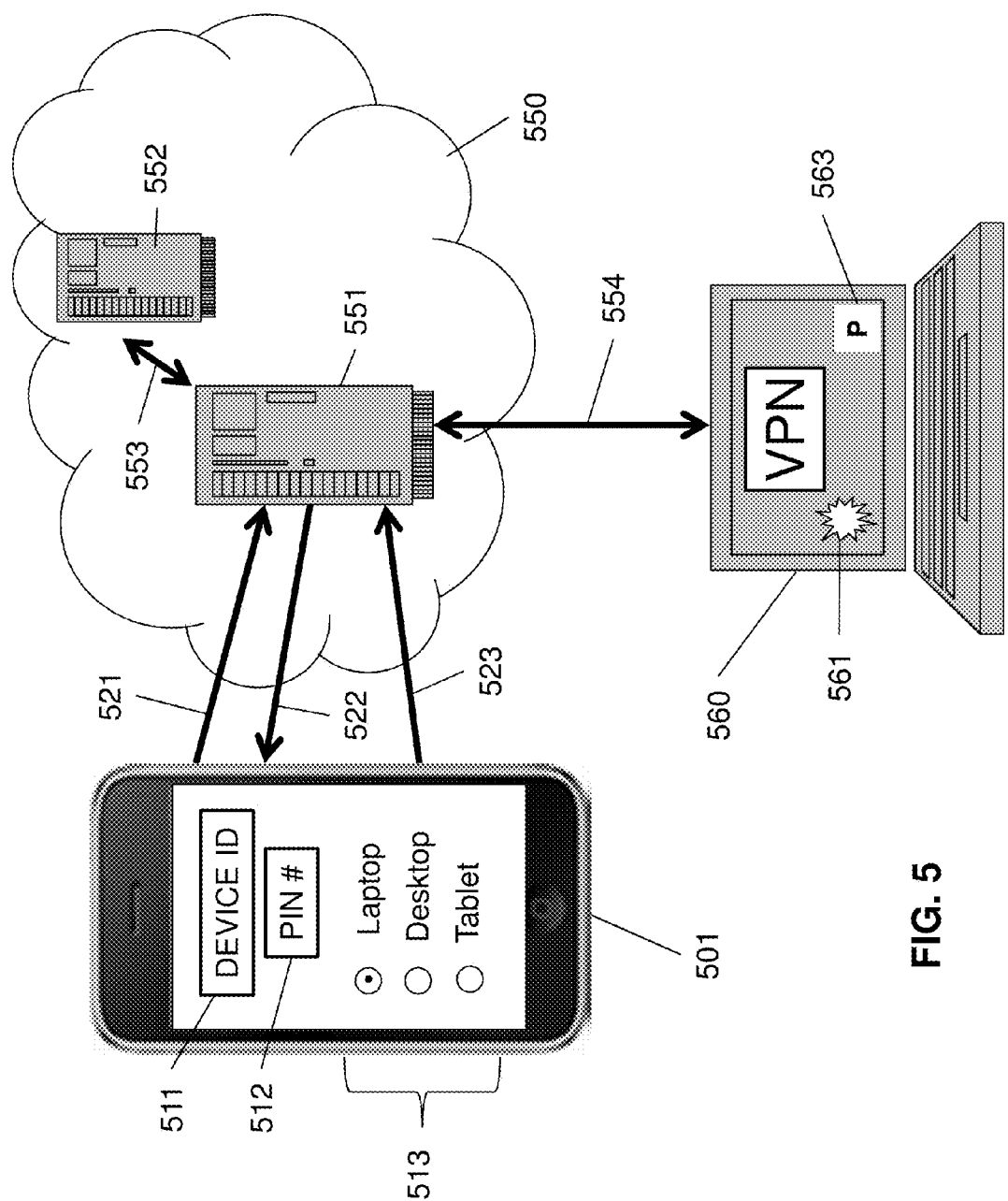
FIG. 5 schematically illustrates connecting a remote device via a virtual private network, in accordance with an embodiment of the disclosure.

In accordance with an embodiment of the disclosure, a virtual private network can be established as schematically illustrated in FIG. 5. In this embodiment, a mobile app for enabling a VPN session in system 500 executes on a mobile device (e.g. a cell phone) 501. The mobile app communicates with a VPN platform 551 hosted on a server operating in a network, schematically shown as cloud 550. Platform 551 connects to an authorized client device 560. As shown in FIG. 5, provisioning and maintenance of the VPN service may be performed on a separate server 552, communicating with the VPN platform via a communication link 553. The mobile app can request a VPN connection on behalf of the client device. When a VPN connection is desired, the mobile app sends a secure request to the platform, which then pushes the VPN connection to the client device.

The mobile app is provisioned on device 501 by a service provider (e.g. a provider of network services on system 100). In this embodiment, the mobile device user's VPN credentials, including an identifier 511 for the device and a user PIN 512, are stored at the device. The mobile app sends a secure request 521 to the platform 551, which authenticates the mobile app and transmits an encrypted data stream 522 with a list 513 of devices authorized to establish a VPN connection with the platform. A secure message 523 identifying the selected device (e.g. laptop 560) is transmitted to the platform. The VPN platform 551 then initiates a connection to the authorized device in accordance with device polling, as detailed below. In an embodiment, the platform facilitates a VPN session between device 560 and a service node providing services to device 560. The service node may be integral to the server hosting platform 551, or alternatively may be a virtual machine executing on the server. In another embodiment, the service node can be remotely located from the server hosting platform 551 such as illustrated by server 841 (see FIG. 8).

Figure 6:
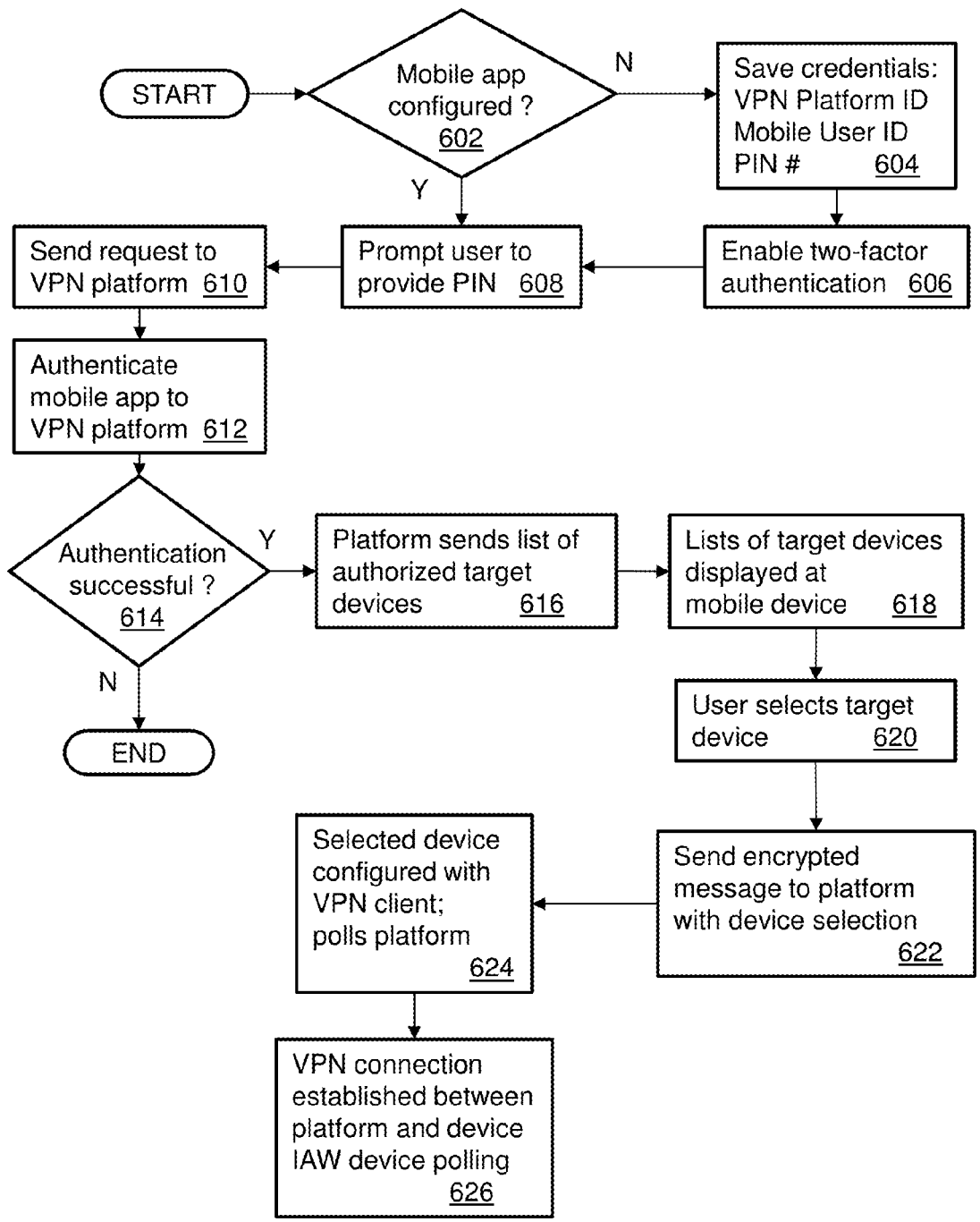
FIG. 6 is a flowchart showing steps in a procedure for establishing a virtual private network using devices and connections as shown in FIG. 5.

FIG. 6 is a flowchart showing steps in a procedure 600 for establishing a virtual private network, in accordance with an embodiment of the disclosure. Procedure 600 can be advantageously performed using system 500. An application executing on mobile device 501 (mobile app) serves as an interface between a user of mobile device 501 and the VPN platform 551. The user first configures the mobile app on device 501 if this has not already been done (step 602). The mobile app is configured with the user's VPN credentials, which are saved within the app (step 604). In this embodiment, the credentials include identification of the VPN infrastructure to be used, the user's VPN identifier, and the user's PIN. The credentials are stored at a secure storage device on device 501.

In an embodiment, the user follows a login procedure for the mobile app which can include a multi-factor authentication process. The mobile app can include a seed for multi-factor authentication obtained from the service provider. In this embodiment, two-factor authentication is used, and the seed is a hash based on a pre-determined value configured when the user is provisioned for the service. For example, the user can select a secret phrase that is encrypted on both the mobile device 501 and the VPN platform 551. The two-factor authentication is enabled (step 606) by hashing the combined values of user ID 511 and PIN 512 with DATE and TIME.

When the user indicates via the mobile device 501 that a VPN connection is desired, the mobile app prompts the user for the PIN 512 (step 608). The mobile app then transmits a request 521 to the platform 551 (step 610). The request 521 can be via IP, SMS, or a phone call (generally, any means for transmitting data from device 501 to platform 551). The platform 551 initiates an authentication process (step 612), in which data is sent from the mobile app to the VPN platform via an encrypted stream.

The VPN platform maintains a list of devices that are authorized to execute a VPN client (that is, devices that have provided authentication information to the platform and are trusted by the platform). If the authentication is successful (step 614), this list of devices is sent to the mobile app (step 616) and displayed to the user as a list of selectable items 513 on device 501 (step 618). The mobile app can receive this information via IP, SMS or some other convenient means. The user selects a device from the list displayed on the mobile app (step 620). This selection is sent in an encrypted data stream 523 to the VPN platform (step 622). The encrypted stream 523 can be sent via IP, SMS or some other means as mentioned above. Data stream 523 also includes information to ensure that the user selection is an authorized transaction. The authorized device (in this embodiment, laptop 560) is configured with a VPN client; the VPN client polls the VPN platform (step 624) to determine if a VPN connection is pending. The VPN platform 551 then initiates a connection to the authorized device (step 626) in accordance with the device polling, as detailed below. As shown in FIG. 5, devices 501 and 560 communicate separately with platform 551 and are not communicatively coupled to each other. In an embodiment, however, both devices may be located conveniently to the user, who can perform the login procedure using mobile device 501 but then work with an application loaded on laptop 560. Since device 560 is authorized to execute a VPN client and is trusted by the platform, another login from device 560 is not required.

Figure 7:
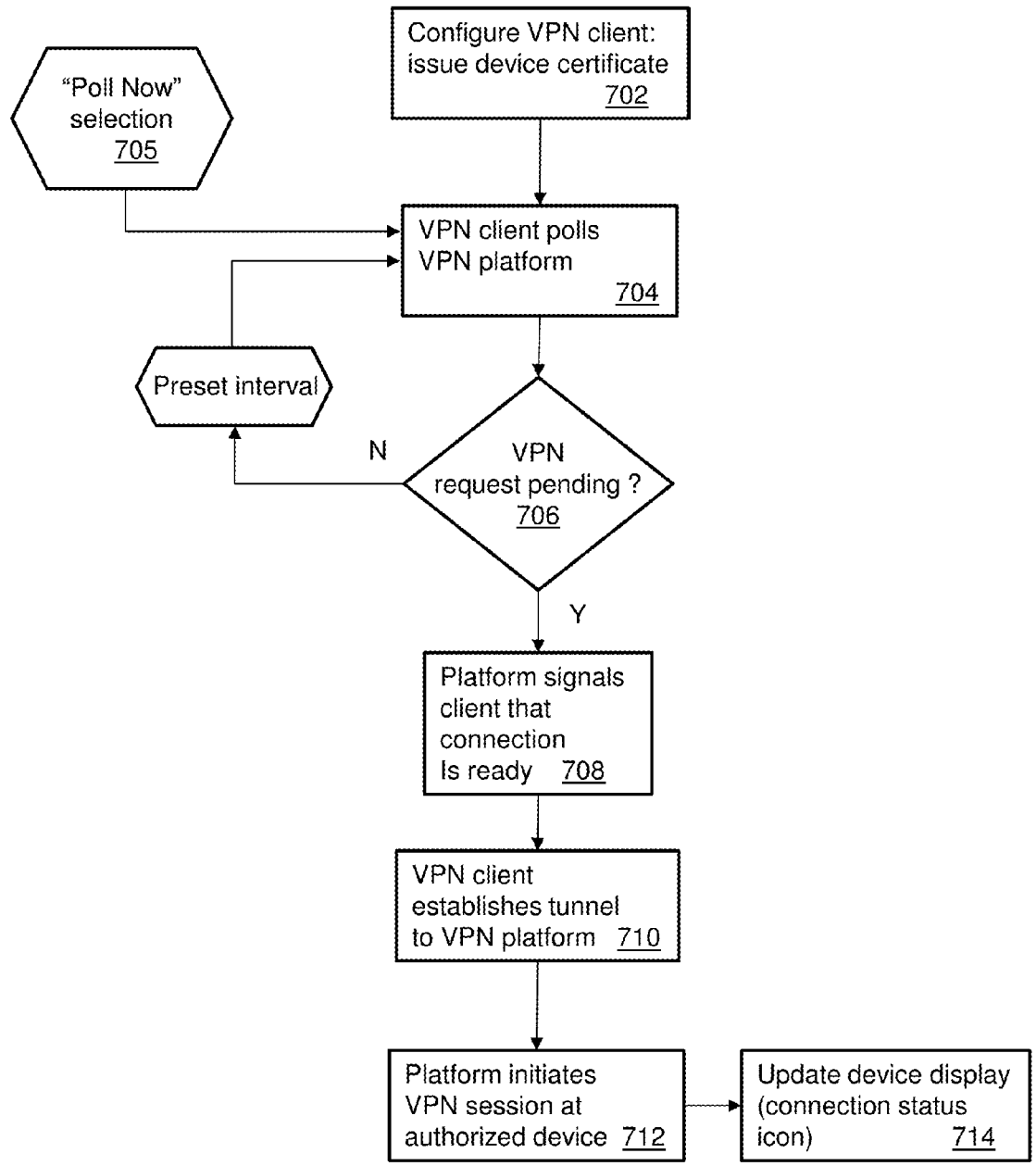
FIG. 7 is a flowchart showing additional steps in a procedure for establishing a virtual private network, in accordance with an embodiment of the disclosure.

The authorized device 560 (selected by the user of the mobile device 501) that uses the VPN connection is configured with a VPN client that polls the VPN platform to determine if a VPN connection is pending. FIG. 7 is a flowchart showing additional steps in a procedure 700 for establishing a virtual private network, in accordance with an embodiment of the disclosure. As part of the VPN service provisioning process, the VPN platform shares authentication information with the VPN client. In an embodiment, the VPN client can be configured with a device certificate (step 702) in a public-key infrastructure (PM) arrangement. The VPN client polls the platform (step 704) at a preset interval (e.g. every 60 seconds). In an embodiment, the VPN client is implemented on the authorized device 560 so that the device displays an icon 561 indicating the status of the connection. In another embodiment, the display also includes a "Poll Now" button 563 so that a user of device 560 can initiate polling before the next poll interval (step 705).

If a VPN connection request is pending (step 706), the platform answers the poll from the VPN client at the authorized device by signaling the client that a connection is ready (step 708). The VPN client then establishes a tunnel 554 to the VPN platform (step 710) so that a VPN session can be initiated by the platform at the authorized device (step 712). The device display is updated (step 714) to indicate that a VPN connection to the device has been established.

Figure 8:
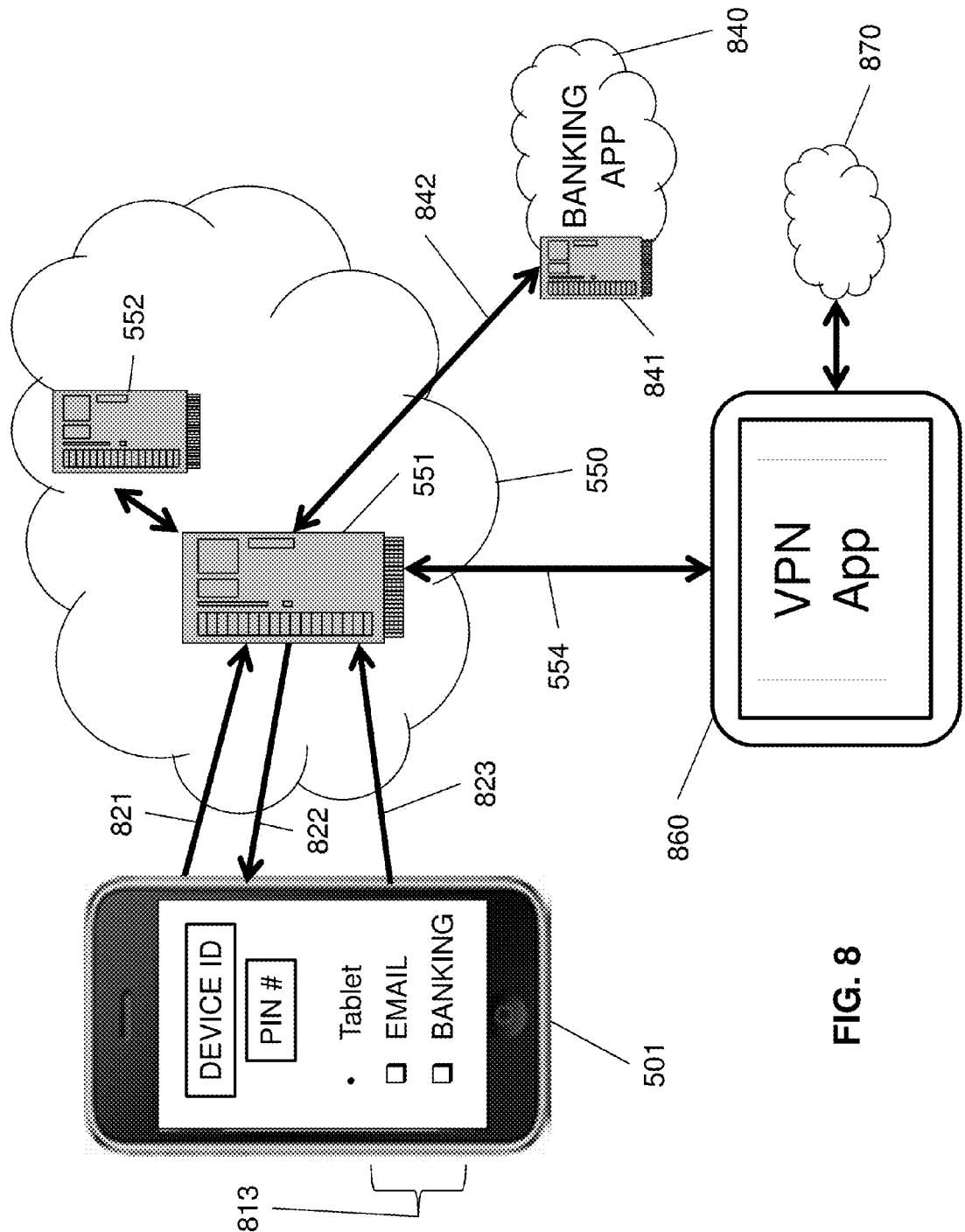
FIG. 8 schematically illustrates connecting a remote device via a virtual private network so that an application executes on the remote device, in accordance with an embodiment of the disclosure.

FIG. 8 schematically illustrates a system 800, in accordance with another embodiment of the disclosure, in which a VPN connection is requested using a mobile app on behalf of an authorized device 860, so that an application executes on that other device. As described above with reference to FIG. 5, a mobile app executing on device 501 sends a secure message 821 to platform 551 which authenticates the mobile app and transmits an encrypted data stream 822 to device 501. The data stream 822 includes a list of devices authorized to establish a VPN connection with the platform, and also includes a list 813 of applications that can be executed on the selected device in a VPN session. (As noted above, the listed devices may be located conveniently to device 501, but are not communicatively coupled to device 501 or to each other.) Although the user logs in (provides his PIN) via device 501, the VPN session is initiated on device 860 and the selected application may be used on device 860 without a further login. In the example shown in FIG. 8, the user of device 501 selects a tablet device, on which email and banking applications can be executed. (Device 860 may be capable of executing various other applications, but the VPN session in this embodiment is limited to the specific application selected by the user.) If the user selects a banking application for the tablet device, a secure message 823 identifying the selected device (tablet 860) and the selected application (banking application 840) is transmitted to the platform. The VPN platform 551 then initiates a VPN connection to the tablet, and also causes the authorized device 860 to execute the banking application 840. In an embodiment, the VPN client is configured so that the VPN session is limited to the application selected by the user (in this example, banking app 840).

In an embodiment, the authorized device 860 is itself connected to another network 870, and remains connected to network 870 while executing the selected application in the VPN session. In this instance, device 860 can be viewed as having a compartmented VPN, on which the banking application is executed in a virtual machine (VM) session.

In a further embodiment, the selected application (in this example, banking application 840) is not configured on the authorized device (in this example, tablet 860) before initiation of the VPN session by platform 551. Platform 551 then establishes the VPN connection to the authorized device, retrieves the selected application from a server 841 via a communication path 842, and distributes the application to the authorized device. In a particular embodiment, platform 551 distributes the application on the fly, as part of the VPN session initiation process. A VPN session is thereby facilitated in which a secure banking or other service is performed, where a VPN is enabled, and where a trusted app is delivered to be used. In the course of executing the banking app in the VPN session, device 860 may communicate with server 841, but only through VPN platform 551. Server 841 is shown in FIG. 8 as remote from platform 551, but alternatively may be integrated with platform 551 or comprise a virtual machine executing alongside platform 551 on the same computing device. In an embodiment, server 841 functions as a service node providing services to device 860 via the virtual private network session. In another embodiment, a first virtual private network session is facilitated between platform 551 and the service node (such as server 841), a second virtual private network session is facilitated between platform 551 and device 860, and a connection is facilitated between the first virtual private network session and the second virtual private network session. Device 860, on whose behalf the mobile app on device 501 requested the VPN session, communicates with platform 551 via path 554 but is not communicatively coupled with device 501 or service node 841 (even though the service node may be a virtual machine executing on the same device as platform 551). Service node 841 communicates with platform 551 via path 842 but is not communicatively coupled with device 501 or device 860.

Figure 9:
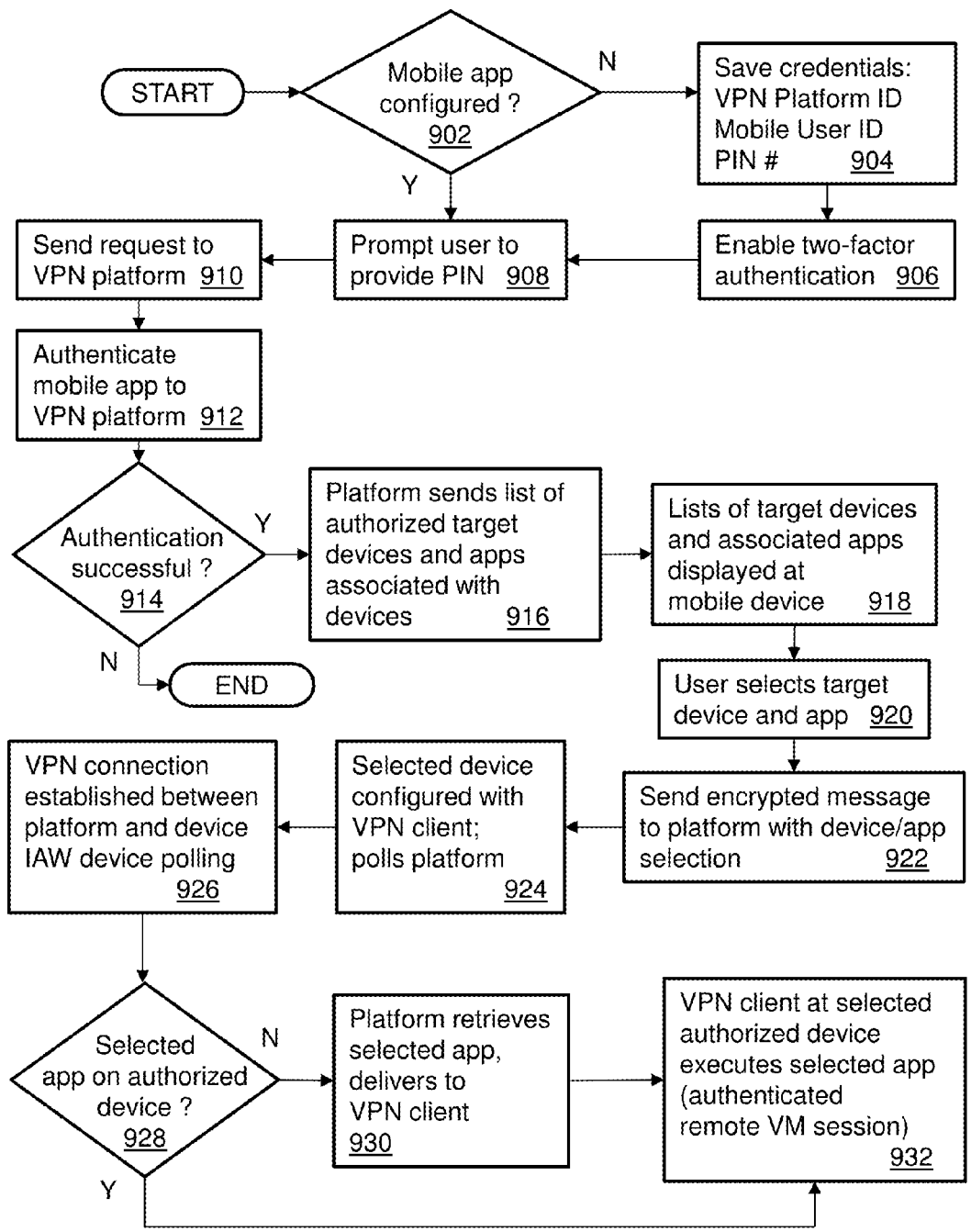
FIG. 9 is a flowchart showing steps in a procedure for establishing a virtual private network where a remote device executes an application as shown in FIG. 8.

FIG. 9 is a flowchart showing steps in a procedure 900 for establishing a virtual private network in which a selected application is executed, in accordance with an embodiment of the disclosure. Procedure 900 can be advantageously performed using system 800. A mobile application offering multi-factor authentication serves as an interface between a user of mobile device 501 and the VPN platform 550. The user first configures the mobile app on device 501 if this has not already been done (step 902). The mobile app is configured with the user's VPN credentials, which are saved within the app (step 904). In this embodiment, the credentials include identification of the VPN infrastructure to be used, the user's VPN identifier, and the user's PIN. The credentials are stored at a secure storage device on device 501.

The mobile app also includes a seed for multi-factor authentication obtained from the service provider. In this embodiment, two-factor authentication is used, and the seed is a hash based on a pre-determined value configured when the user is provisioned for the service. For example, the user can select a secret phrase that is encrypted on both the mobile device 501 and the VPN platform 551. The two-factor authentication is enabled (step 906) by hashing the combined values of user ID 511 and PIN 512 with DATE and TIME.

When the user indicates via the mobile device 501 that a VPN connection is desired, the mobile app prompts the user for the PIN 512 (step 908). The mobile app then transmits a request 821 to the platform 551 (step 910). The request 821 can be via IP, SMS, or a phone call (generally, any means for transmitting data from device 501 to platform 551). The platform 551 initiates an authentication process (step 912), in which data is sent from the mobile app to the VPN platform via an encrypted stream.

The VPN platform maintains a list of devices that are authorized to execute a VPN client, and a list of applications that can run on a selected device with a compartmented VPN. If the authentication is successful (step 914), the list of devices and associated applications is sent to the mobile app (step 916) and displayed to the user as a list of selectable items 813 on device 501 (step 918). The mobile app can receive this information via IP, SMS or some other convenient means. The user selects a device from the list displayed on the mobile app (step 920). This selection is sent in an encrypted data stream 823 to the VPN platform (step 922). The encrypted stream 823 can be sent via IP, SMS or some other means as mentioned above. Data stream 823 also includes information to ensure that the user selection is an authorized transaction. The authorized device (in this embodiment, tablet 860 remote from mobile device 501) is configured with a VPN client; the VPN client polls the VPN platform (step 924) to determine if a VPN connection is pending. The VPN platform 551 then initiates a connection to the authorized device in accordance with the device polling (step 926).

The VPN platform can initiate a VPN connection to the authorized device (which is configured with a VPN client and device certificate) according to procedure 700. If the selected application is already loaded on the authorized device (step 928), the VPN client proceeds to execute the application (step 932). Otherwise, the VPN platform retrieves the application and delivers the application to the VPN client (step 930).

As noted above, software solutions for banking and finance can be implemented according to embodiments of the disclosure, where connectivity is initiated by a trusted device (mobile application) that then initiates a secure VPN from a VPN server farm to authorized devices. In particular, solutions for banking and finance can be implemented where a trusted device initiates the connection in potentially an out of band manner and whereby the VPN platform initiates the connection, eliminating inbound access to the VPN. In other embodiments, applications can be executed on the fly whereby the mobile application lists specific applications that can be initiated on authorized devices. A system implementing this solution can enable not only VPN connectivity, but also distribute and execute remote applications in a secure manner.

According to the disclosure, applications can be enabled to run remotely at authorized devices after a VPN session is initiated. It will be appreciated that applications can be delivered inline to a virtual machine to provide improved security, since not only the VPN but also the application running remotely would be executed on an authorized device.

Upon reviewing the aforementioned embodiments, it would be evident to an artisan with ordinary skill in the art that said embodiments can be modified, reduced, or enhanced without departing from the scope of the claims described below. For example, the functions of the above-described mobile device could be performed by a stationary device executing an application to enable facilitation of a VPN session on behalf of another device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
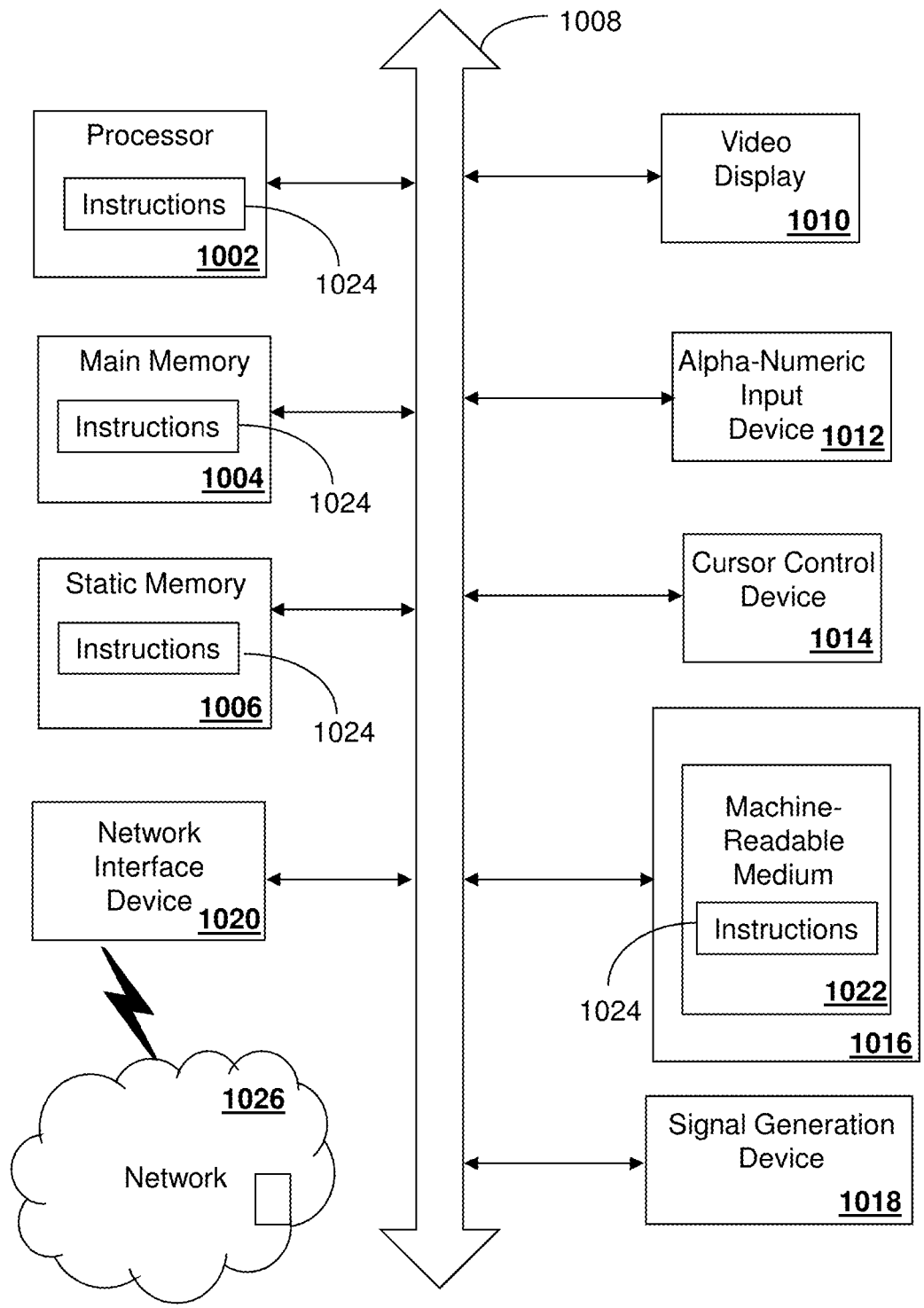
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 130, the VPN platform 551, the VPN provisioning and maintenance server 552, and other devices of FIGS. 1-5 and FIG. 8. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
a processing system including a processor; and
a memory that stores executable instructions that, when executed by the processing system, facilitate performance of operations comprising:
receiving from a mobile device a request to enable facilitation of a virtual private network session on behalf of computing devices other than the mobile device;
receiving from the mobile device authentication information to validate the request;
responsive to successfully authenticating the mobile device:
transmitting to the mobile device a first list of computing devices and a second list of applications executable on each of the computing devices;
receiving from the mobile device a first selection of a target device from the first list of computing devices and a second selection of an application from the second list of applications that is executable by the target device;
facilitating the virtual private network session between the target device and a service node providing services to the target device via the virtual private network session, the target device being other than the mobile device; and
limiting the services provided to the target device by the service node to the application selected from the second list of applications.

2. The server of claim 1, wherein the authentication information is provided over a secure communication session between the mobile device and the server.

3. The server of claim 1, wherein the mobile device is not communicatively coupled to the target device when submitting the request or when the mobile device selects the target device or the application executable by the target device.

4. The server of claim 1, wherein the mobile device is not provided access to the virtual private network session and is not communicatively coupled to the target device.

5. The server of claim 1, wherein the service node is remotely located from the server.

6. The server of claim 1, wherein the service node is an integral part of the server.

7. The server of claim 1, wherein the virtual private network session is facilitated by facilitating a first virtual private network session between the server and the service node, facilitating a second virtual private network session between the server and the target device, and facilitating a connection between the first virtual private network session and the second virtual private network session.

8. A non-transitory computer-readable storage device comprising executable instructions that, when executed by a processing system including a processor, cause the processor to perform operations comprising:
receiving from a first device a request to enable facilitation of a virtual private network session on behalf of devices other than the first device;
receiving from the first device authentication information to validate the request;
responsive to successfully authenticating the first device:
transmitting to the first device a first list of computing devices;
receiving from the first device a first selection of a target device from the first list of computing devices; and
facilitating the virtual private network session between the target device and a service node providing services to the target device via the virtual private network session, the target device being other than the first device.

9. The non-transitory computer-readable storage device of claim 8, wherein the service node comprises a second device not communicatively coupled to the first device.

10. The non-transitory computer-readable storage device of claim 8, wherein the first device comprises a mobile communication device.

11. The non-transitory computer-readable storage device of claim 8, wherein the operations further comprise transmitting to the first device a second list of applications executable on each of the computing devices, and receiving from the first device a second selection of an application from the second list of applications that is executable by the target device.

12. The non-transitory computer-readable storage device of claim 11, wherein the operations further comprise limiting the services provided to the target device by the service node to the application selected from the second list of applications.

13. The non-transitory computer-readable storage device of claim 8, wherein the service node is remotely located from the processor.

14. The non-transitory computer-readable storage device of claim 8, wherein the virtual private network session is facilitated by initiating a first virtual private network session between the processor and the service node, initiating a second virtual private network session between the processor and the target device, and initiating a connection between the first virtual private network session and the second virtual private network session.

15. A method, comprising:
transmitting, by a processing system including a processor of a requesting device, a request to a server to enable initiation of a virtual private network session on behalf of devices other than the requesting device;

transmitting, by the processing system, authentication information to enable the server to validate the request;

receiving, by the processing system, from the server a first list of computing devices; and transmitting, by the processing system, to the server a first selection of a target device from the first list of computing devices to cause the server to initiate the virtual private network session between the target device and a service node providing services to the target device via the virtual private network session, the target device being other than the requesting device.

16. The method of claim 15, wherein the requesting device comprises a mobile device.

17. The method of claim 15, wherein the authentication information is provided over a secure communication session between the requesting device and the server.

18. The method of claim 15, further comprising receiving, by the processing system, from the server a second list of applications executable on each of the computing devices, and transmitting, by the processing system, to the server a second selection of an application from the second list of applications that is executable by the target device.

19. The method of claim 18, further comprising restricting, by the processing system, a scope of the services provided to the target device by the service node to the application selected from the second list of applications.

20. The method of claim 15, wherein the requesting device is not provided access to the virtual private network session and is not communicatively coupled to the target device.

* * * * *